(12) United States Patent
Bernardini et al.

(10) Patent No.: US 8,522,721 B2
(45) Date of Patent: Sep. 3, 2013

(54) ANIMAL CAGE WITH MEANS FOR AUTOMATIC DETECTION OF CAGE CONDITION

(75) Inventors: Pietro Bernardini, Crosio Della Valle (IT); Giovanni Malnati, Malnate (IT)

(73) Assignee: Tecniplast S.p.A., Buguggiate (IT)

( * ) Notice: Subject to any disclaimer, the term of this patent is extended or adjusted under 35 U.S.C. 154(b) by 0 days.

(21) Appl. No.: 13/422,397

(22) Filed: Mar. 16, 2012

(65) Prior Publication Data

US 2012/0234255 A1 Sep. 20, 2012

(30) Foreign Application Priority Data

Mar. 18, 2011 (EP) ..................................... 11158806

(51) Int. Cl.
*A01K 1/03* (2006.01)

(52) U.S. Cl.
USPC .......................................... 119/417; 119/452

(58) Field of Classification Search
USPC ................. 119/417, 416, 418, 421, 452, 458, 119/475
See application file for complete search history.

(56) References Cited

U.S. PATENT DOCUMENTS

| | | | | |
|---|---|---|---|---|
| 3,703,696 A | * | 11/1972 | Browall et al. .................. | 338/35 |
| 3,924,571 A | * | 12/1975 | Holman ........................... | 119/419 |
| 5,081,955 A | * | 1/1992 | Yoneda et al. .................. | 119/417 |
| 6,009,838 A | * | 1/2000 | Carver et al. ................... | 119/500 |
| 6,293,229 B1 | * | 9/2001 | Edstrom, Sr. .................. | 119/482 |
| 6,625,934 B1 | * | 9/2003 | McGrath, III ................... | 52/27 |
| 6,998,980 B2 | * | 2/2006 | Ingley et al. .............. | 340/539.26 |
| 7,527,020 B2 | * | 5/2009 | Conger et al. ................. | 119/417 |
| 7,661,392 B2 | * | 2/2010 | Conger et al. ................. | 119/417 |
| 7,739,984 B2 | * | 6/2010 | Conger et al. ................. | 119/455 |
| 7,874,268 B2 | * | 1/2011 | Conger et al. ................. | 119/418 |
| 7,970,495 B2 | * | 6/2011 | Conger et al. ................. | 700/301 |
| 7,997,234 B1 | * | 8/2011 | Hughey ........................ | 119/496 |
| 8,082,885 B2 | * | 12/2011 | Conger et al. ................. | 119/419 |
| 8,171,887 B2 | * | 5/2012 | Conger et al. ................. | 119/417 |
| 2006/0071785 A1 | | 4/2006 | Ahmed et al. | |

FOREIGN PATENT DOCUMENTS

| | | |
|---|---|---|
| EP | 1935236 A1 | 6/2008 |
| WO | 2007149528 A2 | 12/2007 |

OTHER PUBLICATIONS

European Search Report for Application No. 11158806.7-1260, Jul. 11, 2008.

* cited by examiner

*Primary Examiner* — Yvonne Abbott
(74) *Attorney, Agent, or Firm* — LeClairRyan, a Professional Corporation

(57) ABSTRACT

A method and apparatus that detects a condition of a cage for housing laboratory animals includes providing an animal cage including a base part and a top and cage means for automatically detecting at least one of at least one bedding condition corresponding to a humidity level or an occurring flooding condition. At least one of the resistance or the impedance of material between said pair of electrodes is determined using one of direct current (DC) or alternating current (AC). At least one of the bedding condition or the flooding condition is measured based on a rate of one or more changes of one of a resistance or an impedance of said material between said electrodes.

19 Claims, 4 Drawing Sheets

ANIMAL CAGE WITH MEANS FOR AUTOMATIC DETECTION OF CAGE CONDITION

CROSS-REFERENCE TO RELATED APPLICATIONS

This application claims the benefit of European Patent Application No. 11158806.7, filed Mar. 18, 2011, which is hereby incorporated by reference in its entirety.

FIELD OF THE INVENTION

This technology generally relates to animal cages and more specifically to animal cage provided with special means for monitoring and controlling the cage micro-environment conditions.

BACKGROUND OF THE INVENTION

In the field of animal management, specifically that of laboratory animals, such as rodents, the environment inside the cages must be tightly controlled to prevent contaminations of the animals by the external environment and/or contamination of the environment and humans by the animals.

Research animals are becoming more valuable because many disease models are expensive and time consuming to develop on animals and some animals may have gone through longitudinal studies accumulating valuable long term data from experiments thus making them extremely critical to basic science research and medical device and drug development programs.

Most research institutions invest substantial resources to keep these valuable animal assets safe. A vivarium facility, including the shelving storage and the cages, is a repository where researches store their valuable animals. Individually ventilated cages ("IVC") and rack systems are widely used for housing laboratory animals that enable a plurality of such animal cages to be arranged in a industrious and efficient manner. These systems are designed for providing a highly consistent environment across all cages on each rack.

Nonetheless, it is not uncommon for one single rack to house animals from multiple study protocols that may have different controls and environmental requirements. Therefore, there is a need for a highly adaptable caging system that can provide researchers and vivarium management flexibility to accommodate such emerging market needs on a single rack system.

Furthermore, some vivarium facilities support "long term studies", where a "long term study" is defined as a research study that involves research animals monitored by recording devices and necessary equipment to collect data either continuously or at pre-set intervals from animals or from sensing instruments surrounding the animals. The duration of such studies may last for as little as a workday (at least 8 hours) or up to to the maximum lifespan of the animals being studied.

Cage level monitoring devices have been evaluated and sometimes adopted on limited scale for decades to provide precise measures and controls of micro-environment and, in some cases, the animals inside. The basic concept of an operant cage is almost a century old. However, deploying active monitoring on a large and industrious scale has been inefficient and challenging because of cost and reliability issues.

One challenging issue is to satisfy stringent cleaning requirements of monitoring and control equipment on large scale. Some electronic equipment is hard to decontaminate and other electronic equipment may not withstand harsh cleaning agents or methods. Increasingly, sophisticated animal models are developed with animals that have immune deficiency or multiple diseases, for example, making these animals extremely sensitive to the cleanliness of the cage micro-environment. A lot of resources are dedicated to minimize cross-contaminations between cages and cohorts of animals from different study protocols. Therefore, there is an unmet need for an efficient way to keep monitoring equipment and devices around and near each cage clean.

Many modern vivarium facilities use sophisticated technologies to provide consistently high quality of care for these valuable animal assets. Besides housing, another concern is providing quality drinking water to every cage with methods such as water packs, automated filled water bottles, and automatic watering systems. These watering methods typically are very reliable. However, their failures can cause cage flooding which may lead to animal distress or even death from hypothermia or drowning.

Therefore, there is a market need for a highly reliable and specific flooding detection and warning system to safeguard against potentially devastating loss of animal assets. Additionally, there is an unmet need for a cage provided with means suitable to automatically detect the bedding conditions in order to constantly control the environment of the cage.

Lab animal housing requirements include both reducing research variations by employing strategies to provide consistent micro-environment of the cage and monitoring micro-environments to detect unexpected issues early so that expensive and valuable animal models are not lost. Such measures mitigate outbreaks and more actively and reliably control the cage/animal parameters. As research animals become more valuable, researchers are increasingly more interested in using monitoring equipment to extract useful data in a home cage environment.

To increase capacity and quality for monitoring these valuable research animals, there are some basic needs such as water quality, safety to animals, and a direct control of the cage environment by monitoring both excessive water indicating cage flooding, and the bedding condition providing objective metrics for determining when to replace soiled bedding.

SUMMARY OF THE INVENTION

One object is to provide an animal cage provided with active monitoring and control of the micro-environment of the cage.

Another object is to provide an animal cage with automatic detection system for monitoring cage conditions, i.e. soaking wet bedding, in order to promptly detect a flooding condition, and overly moist bedding being an indication for changing soiled bedding.

Another object is to provide an animal cage adapted to be associated to an animal caging containment system, i.e. a rack, a platform, or a supporting structure in general, provided with system means suitable to interact with the bedding conditions detection means of the cage.

These objects, and others that will be more clear in view of the detailed description, are achieved by an animal cage provided with specially designed features in order to active monitoring and control the micro-environment of the cage.

BRIEF DESCRIPTION OF THE DRAWINGS

Further characteristics and advantages of this invention will become clear from the following detailed description that is merely illustrative and not limitative and is shown in the figures that are attached hereto, in which.

DETAILED DESCRIPTION OF THE INVENTION

Figure 1:
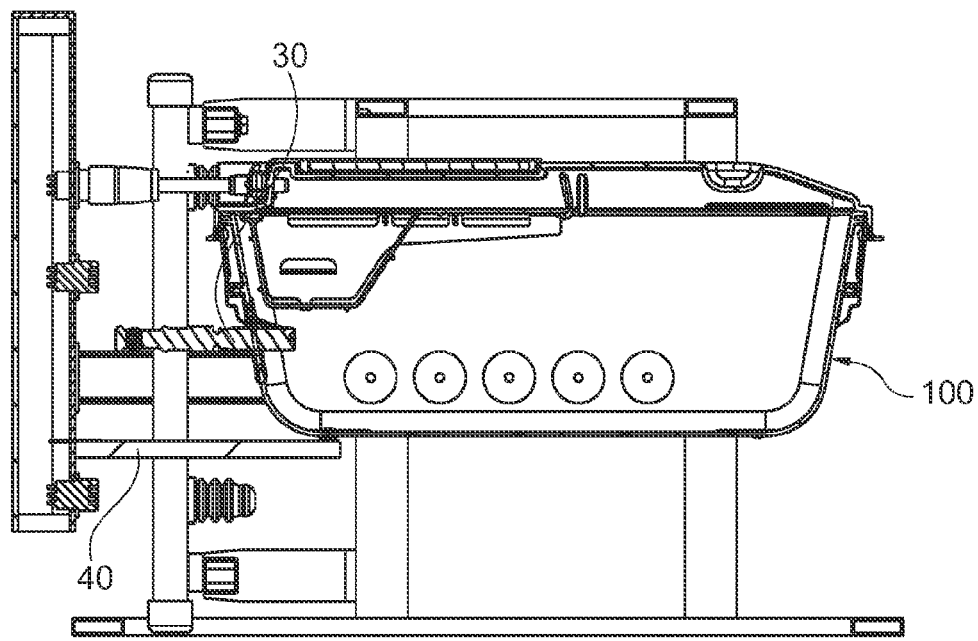
FIG. 1 shows a cross section of a lateral view of an exemplary animal cage, the cage being assembled on a single place-rack specially designed to receive such a cage.
Figure 2:
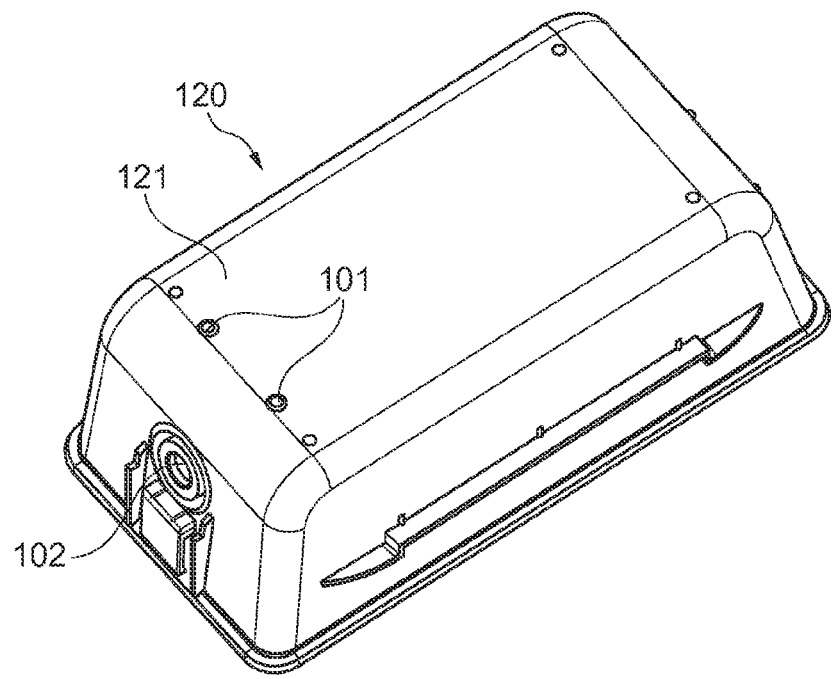
FIG. 2 shows the bottom surface of an exemplary animal cage.

According to one exemplary embodiment of the present invention, as illustrated in the identified figures, the animal cage 100 includes a base part 120 and a top or lid 110. The base part 120 is provided on the bottom wall 121 thereof, with cage means 101 for automatically detecting the cage condition.

In more detail, the cage means 101 are suitable to detect the bedding condition, in particular with reference to the moisture degree of the bedding, and/or to detect the presence of water in a cage even in the case that the cage is not filled with bedding material.

By monitoring the impedance of said cage means 101, it is therefore possible to instantly and reliably detect the humidity level of the bedding and/or to promptly detect a flooding condition.

In more detail, such cage means 101 includes at least two electrodes provided on the bottom of the base part 120 of the cage.

The exemplary cage means 101 includes at least a pair of electrodes. Each pair of electrodes allows interrogation of the average electrical properties of materials between the electrodes. The electrodes are made of a highly conductive material, e.g. a metallic material. In general, this invention enables measuring impedance (with direct current DC and/or alternating current AC) of the target material inside the cage. Different frequency may be used with the same set of electrodes to measure different aspects of the condition inside the cage.

The electrodes should be positioned on the external surface of the bottom wall 121 of the base part 120 of the cage, projecting inside the cage.

In one form, electrical resistance can be used to measure humidity condition of the bedding, i.e. to monitor the moisture and, therefore, the dirtiness of the bedding. Additionally, the electrical resistance can be used to measure and promptly detect excessive water being accumulated inside the cage.

One exemplary embodiment uses two electrodes which could be in the form of buttons or pins 101, spaced by approximately 50 mm and projecting inside the cage in the region of the automatic watering system device 30.

On the external side of the cage, said buttons or pins 101 are electrically isolated from the cage by means of elastomeric washers, thus not compromising the possibility for the cage to be autoclaved during standard sterilization process.

The cage means 101 for automatically detecting the cage condition are coupled, when the cage is inserted for example in an animal caging system 1, to system means 40 for the automatic detection of the cage condition.

The caging system 1 may be a rack comprising a plurality of single place stations or a single place-rack, suitable to receive a single cage 100.

According to one exemplary embodiment, the system means 40 may for example comprise an electro-conductive plate 40 adapted to contact both said buttons or pins 101, thus closing the electric circuit between the pins 101 and measuring the electric resistance between the pins.

The cage means for automatically detecting the cage condition can therefore detect both water accumulation, e.g. a flooding or a potentially dangerous water accumulation inside the cage, with or without bedding, and an overly moist bedding condition, which is an indication for changing soiled bedding.

Since most drinking water contains trace level of mineral salts, the pins allow the current passage, and therefore the electric resistance between the pins can be measured, even in the case that the cage is not filled with bedding.

Note that cage flooding usually happens when there is a sudden increase in the amount of water inside the cage due to malfunction of the drinking water source. One aspect of the invention is to measure the rate of the resistance changes over time. A rapid decrease in resistance would indicate a possible cage flood.

Such detection would be monitored by an external controller which can be connected to a warning system typically found inside a vivarium facility.

In one exemplary operation, the effects of dry and wet bedding inside a cage equipped with electrodes have been compared. With dry bedding, the measured resistance is about 50 MOhm, while soaking wet bedding, the resistance is about 50 kOhm. The difference in the measured values is a few orders of magnitude. Therefore the bedding condition can detected based on such measured values.

Additionally, measuring of the electric resistance between the pins of the cage can be used not only to detect a flooding condition of the cage but also to provide a relatively reliable indication of the bedding condition.

It is common for vivarium facilities to schedule periodic changing of the bedding, such as every fourteen days for IVC. In order to change the bedding of the cage, the cage can be removed from the rack and the animals can be moved from the old cage to a new one, filled with dry bedding material, at a predetermined time, regardless of the real condition of the bedding. Such unguided process can generate a large volume of waste bedding and consume significant amount of resources. Therefore, a more objective means for monitoring bedding condition can reduce wasting resources.

Exemplary means for automatically detecting a cage condition is to measure the electric resistance between the pins 101 which detects the effective bedding humidity level. The resistance change associated with bedding condition derives from the accumulation of minerals typically associated with urine and waste materials from animals. The process for generating such materials is significantly slower than that from cage flooding. By differentiating the timed response for such resistance change, the vivarium staff is provided an objective measure for detecting soiled bedding condition associated with a slow response, and a possible cage flood often associated with a rapid response.

In one example, a couple of electric tabs or tongues, electrically isolated one from each other, are provided inside the cage, each contacting one of said pins 101. Through said tongues the electric signals are carried, through the pins 101, outside the cage.

The electric resistance of the bedding can be measured at a predetermined time interval, e.g. every half an hour, thus avoiding the possibility to altering the cage conditions, even if the voltage is very low, including between 1.5 and 3 Volts.

The cage condition, bedding moisture level, and/or flooding condition can therefore be checked automatically and relatively reliably by means of the electric signal provided by the system 40 and cage 101 means, allowing the relatively immediate and effective detection of a potentially dangerous condition.

Figure 3:
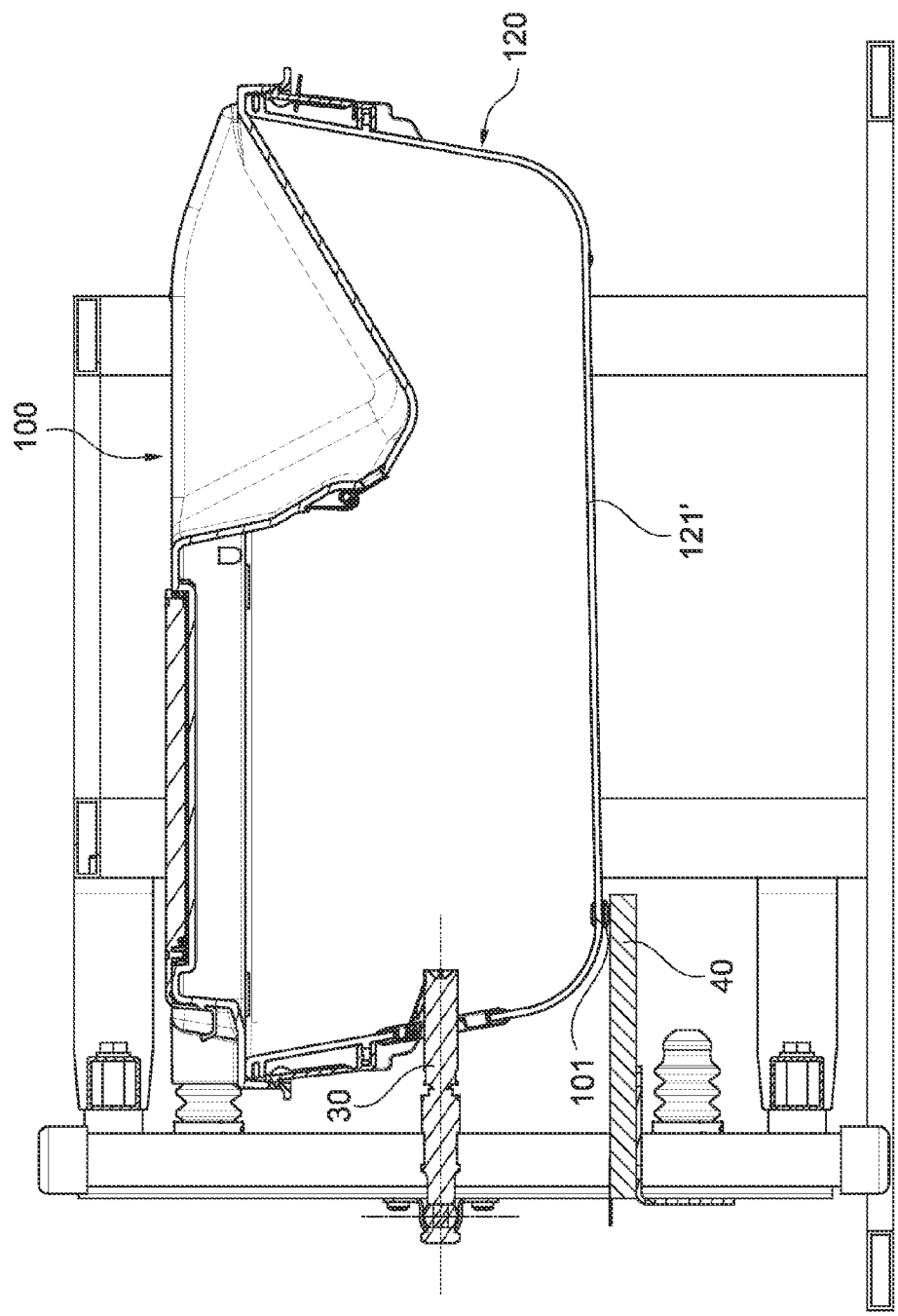
FIG. 3 shows a cross section of a lateral view of an exemplary animal cage, the cage being assembled on a single place-rack specially designed to receive such a cage.

As an example of possible connection of the cage with a specially designed single-place station or rack, reference is made to FIGS. 1 and 3, in which the cage 100 is placed on a station or a rack equipped with sensors in its single place. An automatic watering device 30 is inserted in the cage itself, thus allowing the watering of the animals.

The cage is therefore provided with an opening 102 suitable to receive the watering device 30, while in the area below the watering device 30, the cage is provided with the cage means 101 for automatically detecting cage condition, in the bottom wall 121 of the cage.

In order to measure the electric resistance between the pins 101, the cage place is provided with system means 40 for the automatic detection of the cage condition.

Such system means 40 can include, in one example, a metal plate 40 connected to a specially designed electric circuit and suitable to contact both the pins 101 in the lower region of the cage.

As per the description above, at least two electrodes can be placed at the cage floor. The electrodes are made of highly conductive materials (e.g. metal) that allow electrical current and can resist typical cage cleaning processes. Furthermore, the electrodes can be placed strategically to optimize the sensitivity and specificity of the parameters of interest for measurements.

If the objective is to measure the water accumulation inside a cage, it is possible to provide a bevel or ramped cage bottom 121' so that the water would accumulate at the valley of the bevel and the electrodes are placed strategically there to detect water accumulation. The bevel/ramp can have a very gentle slope so that it would not create a stressful environment for animals.

According to one aspect, the terms "inclined" or "ramped" or similar terms are intended with respect to the horizontal plane, in a condition in which the cage is associated to the rack or to the single place station of the facility.

A first example of such cage design in which the bottom of the cage has a gentle slope with respect to the horizontal plane is shown in FIG. 3, in which the bottom surface 121' of the base 120 of the cage is inclined with respect to the horizontal plane.

In another example, each electrode can be placed at one valley on the cage floor. There can be a small hump or hill between the two valleys thus creating a physical threshold below which there would not be an electrical connection. With this design, the electrical connection can be detected only when there is a sufficient amount of conducting material (e.g. water) rising above the threshold to close the circuit. This feature can minimize false alarms.

Figure 4:
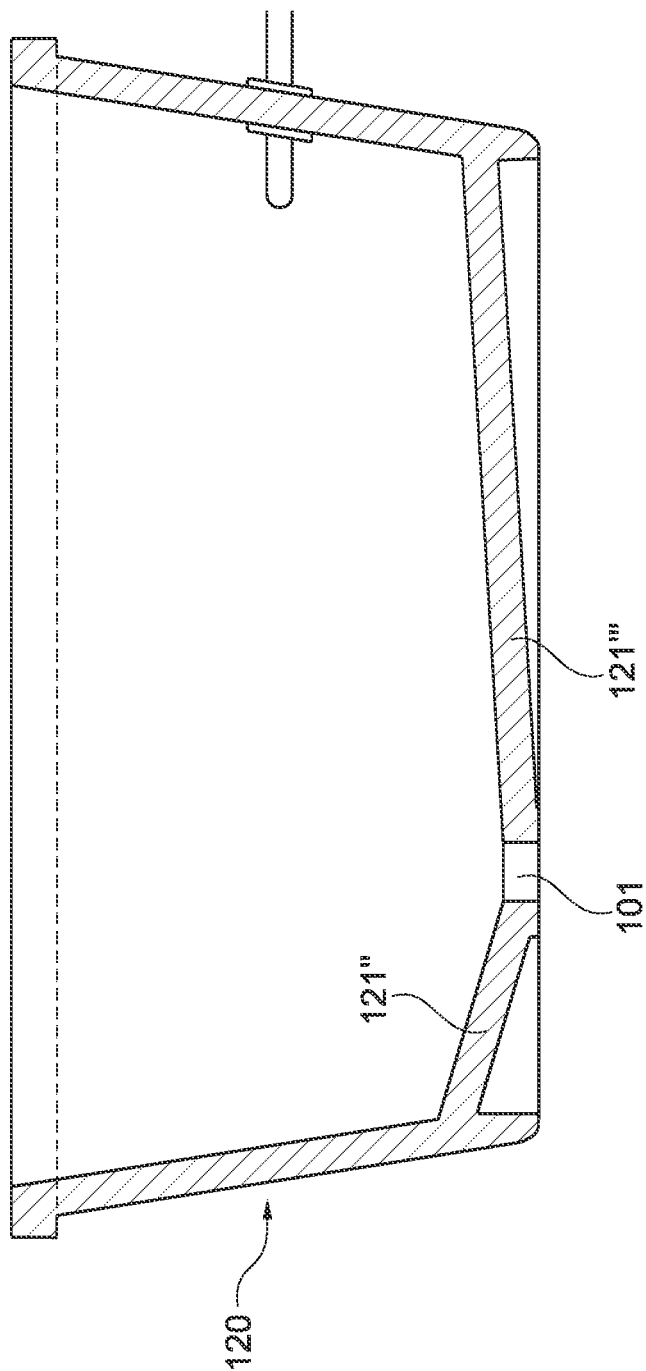
FIG. 4 shows a simplified lateral sectional view of an exemplary base part of an exemplary animal cage.
Figure 5:
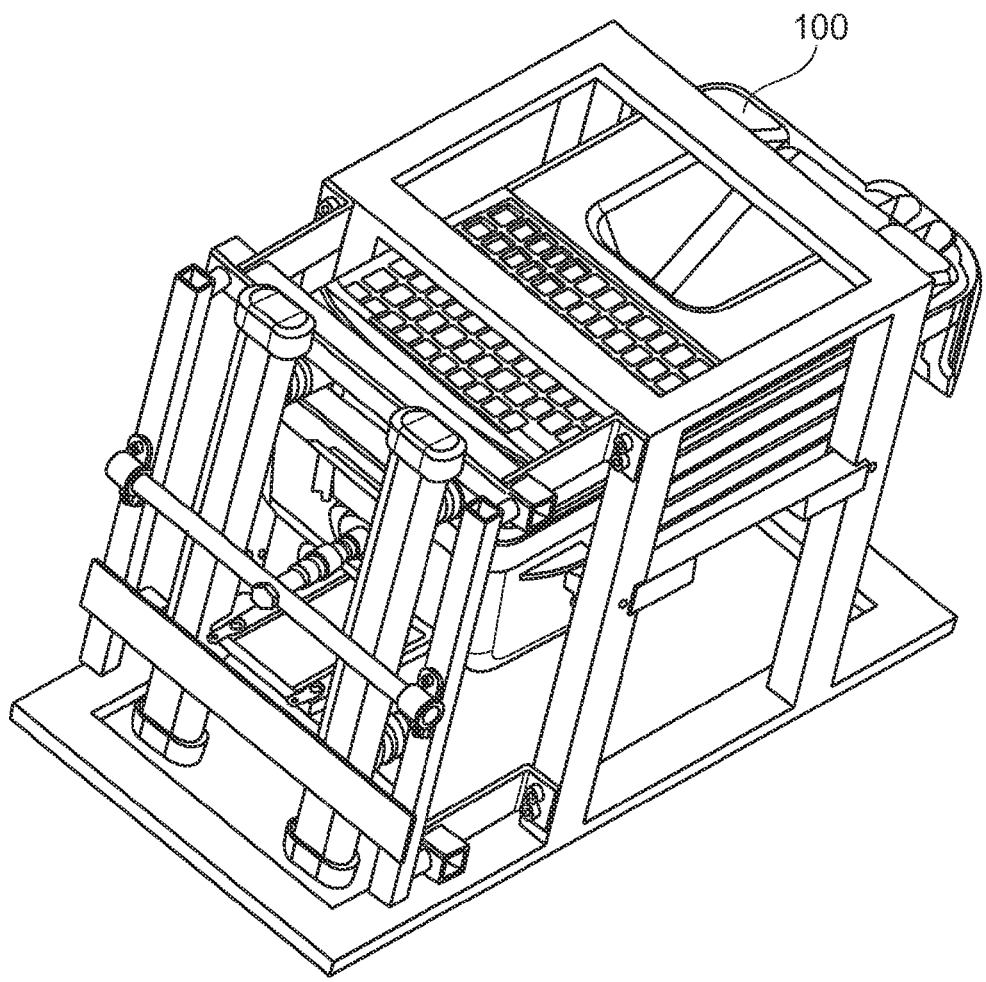
FIG. 5 shows a perspective view of an exemplary animal cage inserted in a single place-rack.

FIG. 4 shows another exemplary embodiment of the base part of an exemplary cage, in which the bottom surface has a profile which includes two ramped sections 121" and 121''' each one inclined with respect to the horizontal plane so that gentle slopes draw excess fluid or water to a valley where the electrodes 101 are located.

The valley is placed at the front portion of the cage so that excess water is channel there to trigger off flood detection system thus keeping dry the back portion of the cage where animals typically like to stay.

In another exemplary embodiments, multiple electrodes can be provided. One arrangement is, for example, to have four electrodes, each placed close to one corner of the cage. This arrangement would allow for a better spatial mapping of the wetness inside cage. This could potentially compensate for potential issues such as the cage bottom not perfectly flat or uneven distribution of bedding effecting electrical signal.

A control unit can interrogate whether electric current is passed between electrodes to detect impedance of materials between electrodes.

Interrogating electric current does not have to run continuously but at a sampling rate that is meaningful to obtain the desired information on the status of cage.

Figure 6:
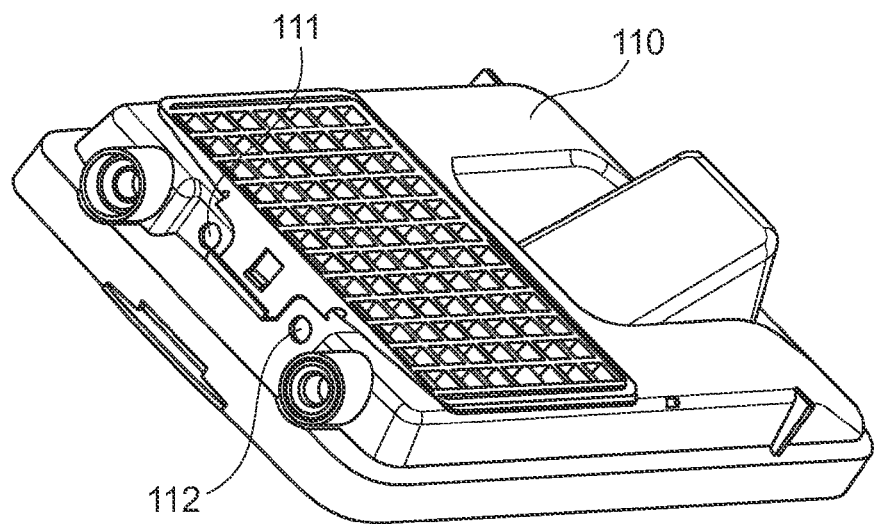
FIG. 6 shows a detail of an exemplary cover of an exemplary animal cage.

In case the rack or the single place on which the cage is inserted is provided with one or more sensors 10 suitable for measuring the environmental parameters inside the cage, the top 110 of the cage 100 may be provided with sensor holes 111, 112, as shown on FIG. 6, which allow the possibility to positioning at least part of the sensors 10 inside the cage.

Having thus described the basic concept of the invention, it will be rather apparent to those skilled in the art that the foregoing detailed disclosure is intended to be presented by way of example only, and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. An animal cage apparatus, comprising:
   a base part and a top; and
   a cage condition detection apparatus that automatically detects at least one bedding condition corresponding to a humidity level or an occurring flooding condition, wherein said cage condition detection apparatus comprises at least a pair of electrodes provided proximate a bottom wall of said base part and electrically connected to conductive material positioned on an external surface of said bottom wall and projecting toward an interior portion of the cage.

2. The animal cage apparatus of claim 1, wherein said electrodes comprise buttons or pins and the electrodes are spaced apart.

3. The animal cage apparatus of claim 2, wherein said electrodes are electrically isolated from the cage by one or more elastomeric washers.

4. The animal cage apparatus of claim 3, wherein said cage condition detection apparatus further comprises at least one of a pair of electric tabs or a pair of electric tongues wherein each of the pair of electric tabs or the pair of electric tongues are electrically isolated from each other, provided inside the cage, and configured to contact one of said electrodes such that electric signals are carried outside the cage through each of the pair of electric tabs or each of the pair of electric tongue and through said electrodes.

5. The animal cage apparatus of claim 1, wherein said bottom wall of said base part includes at least one portion or a plurality of portions inclined with respect to a horizontal plane.

6. The animal cage apparatus of claim 5, wherein each of the plurality of portions of the bottom wall of the base part is inclined with respect to the horizontal plane.

7. The animal cage apparatus of claim 6, further comprising at a front wall of the cage, an opening suitable to receive an automatic watering device.

8. The animal cage apparatus of claim 7, wherein said bottom wall is inclined toward an area of the cage below said opening suitable to receive said automatic watering device.

9. The animal cage apparatus of claim 8, wherein said cage condition detection apparatus is located at said area of the bottom surface below said opening suitable to receive said automatic watering device.

10. The animal cage apparatus of claim 6, wherein said bottom wall further comprises two ramped sections inclined with respect to the horizontal plane such that a valley is created where the electrodes are disposed.

11. The animal cage apparatus of claim 1, wherein said bottom wall includes two equal depth low points such that the electrodes are capable of collecting fluid at both low points.

12. The animal cage apparatus of claim 1, wherein said top includes a plurality of sensor holes configured to facilitate introduction into the cage of one or more sensors.

13. A method for detecting a bedding condition, comprising:
periodically determining at least one of a resistance or an impedance of conductive material projecting toward an interior portion of the animal cage and provided between a pair of electrodes disposed proximate an external surface of a bottom wall of a base part of an animal cage using one of direct current (DC) or alternating current (AC);
determining whether a rate of change of the resistance or the impedance of said material between said electrodes exceeds a threshold; and
providing an indication of a bedding condition when it is determined that the rate of change of the resistance or the impedance exceeds the threshold.

14. An animal cage, comprising:
a base part and a top; and
at least a pair of electrodes provided proximate a bottom wall of the base part and conductive material electrically connected to the pair of electrodes, positioned on an external surface of the bottom wall, and projecting toward an interior portion of the animal cage, wherein the bottom wall converges proximate the at least a pair of electrodes or the conductive material.

15. The animal cage of claim 14, further comprising a front wall comprising an opening configured to receive an automatic watering device.

16. The animal cage of claim 15, wherein the at least a pair of electrodes or the conductive material is disposed substantially below the opening configured to receive the automatic watering device.

17. The animal cage of claim 14, wherein the electrodes further comprise buttons or pins and are spaced apart.

18. The animal cage of claim 14, wherein the electrodes are electrically isolated from at least the bottom wall.

19. The animal cage of claim 14, further_comprising a pair of electric tabs or a pair of electric tongues, wherein each of the pair of electric tabs or the pair of electric tongues are electrically isolated from each other, disposed on the interior portion, and configured to contact one of the electrodes such that electric signals are carried externally through each of the pair of electric tabs or each of the pair of electric tongue and through the electrodes.

* * * * *